US010962796B2

(12) United States Patent
Song et al.

(10) Patent No.: US 10,962,796 B2
(45) Date of Patent: Mar. 30, 2021

(54) BEAM DEFLECTOR AND THREE-DIMENSIONAL DISPLAY DEVICE INCLUDING THE SAME

(71) Applicant: SAMSUNG ELECTRONICS CO., LTD., Suwon-si (KR)

(72) Inventors: Hoon Song, Yongin-si (KR); Jungkwuen An, Suwon-si (KR); Young Kim, Yongin-si (KR); Kanghee Won, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/206,555

(22) Filed: Nov. 30, 2018

(65) Prior Publication Data

US 2019/0258069 A1    Aug. 22, 2019

(30) Foreign Application Priority Data

Feb. 19, 2018  (KR) .................. 10-2018-0019529

(51) Int. Cl.
*G02B 30/26*       (2020.01)
*G02F 1/29*        (2006.01)
*G02B 30/34*       (2020.01)
*G02B 27/00*       (2006.01)

(52) U.S. Cl.
CPC ......... *G02B 30/26* (2020.01); *G02B 27/0093* (2013.01); *G02B 30/34* (2020.01); *G02F 1/29* (2013.01); *G02F 2201/16* (2013.01); *G02F 2203/07* (2013.01)

(58) Field of Classification Search
CPC ...... G02B 27/225; G02B 30/26; G02B 30/34; G02F 2203/07; G02F 1/29
See application file for complete search history.

(56) References Cited

U.S. PATENT DOCUMENTS 5,126,869 A * 6/1992 Lipchak ............... G01S 7/4811
                                             349/117
9,140,912 B2   9/2015 Choe et al.
(Continued)

FOREIGN PATENT DOCUMENTS

| EP | 2208111 B1 | 1/2012 |
| KR | 10-2015-0088498 A | 8/2015 |
| WO | 02079871 A2 | 10/2002 |

OTHER PUBLICATIONS

Communication dated Jul. 2, 2019, issued by the European Patent Office in counterpart European Application No. 19158017.4.
(Continued)

*Primary Examiner* — Michael H Caley
*Assistant Examiner* — Mariam Qureshi
(74) *Attorney, Agent, or Firm* — Sughrue Mion, PLLC

(57) ABSTRACT

A beam deflector and a three-dimensional (3D) display device including the beam deflector are provided. The beam deflector includes a first deflector configured to controllably deflect incident light having a first polarization state in a first horizontal direction; a half-wave plate configured to rotate a polarization of light transmitted by the first deflector by 90°; and a second deflector configured to controllably deflect light transmitted by the half-wave plate having the first polarization state in a second horizontal direction that is different from the first horizontal direction.

17 Claims, 15 Drawing Sheets

(56) References Cited

U.S. PATENT DOCUMENTS

| | | | | |
|---|---|---|---|---|
| 2002/0154377 | A1* | 10/2002 | Pepper | G02F 1/13471 359/245 |
| 2003/0098945 | A1* | 5/2003 | Sugimoto | G02F 1/133504 349/172 |
| 2007/0008617 | A1* | 1/2007 | Shestak | G02F 1/133526 359/455 |
| 2010/0149444 | A1* | 6/2010 | Hikmet | G02F 1/29 349/15 |
| 2014/0055692 | A1* | 2/2014 | Kroll | G02F 1/1347 349/15 |
| 2016/0147003 | A1 | 5/2016 | Morozov et al. | |
| 2018/0129105 | A1 | 5/2018 | Kim et al. | |
| 2018/0149790 | A1 | 5/2018 | Kim et al. | |
| 2019/0113802 | A1 | 4/2019 | Won et al. | |
| 2019/0339552 | A1* | 11/2019 | Gao | H01L 27/3232 |

OTHER PUBLICATIONS

Kim, Yun-Tae et al., "Holographic Augmented Reality Head-Up Display with Eye Tracking and Steering Light Source", The 23rd IDW 2016, Dec. 9, 2016, pp. 1308-1311. (4 pages total).

* cited by examiner

BEAM DEFLECTOR AND THREE-DIMENSIONAL DISPLAY DEVICE INCLUDING THE SAME

CROSS-REFERENCE TO RELATED APPLICATION

This application claims priority from Korean Patent Application No. 10-2018-0019529, filed on Feb. 19, 2018, in the Korean Intellectual Property Office, the disclosure of which is incorporated herein in its entirety by reference.

BACKGROUND

1. Field

Example embodiments of the present disclosure relate to a beam deflector and a three-dimensional (3D) display device including the beam deflector.

2. Description of the Related Art

Holographic displays are capable of providing clear 3D images in a wide depth-expression range without causing eyestrain and are thus considered to be the ideal 3D display technology. However, such a holographic display requires a high-resolution spatial light modulator (SLM) having a pixel size on the order of the wavelength of the light used, a coherent surface light source, and large amounts of computer generated hologram (CGH) calculations.

According to a recently proposed binocular hologram method, hologram images are generated and transmitted in a limited manner to only the fields of vision of the eyes of an observer so as to lower data processing and resolution conditions. For example, a hologram image having a point of view corresponding to the field of vision of the left eye of an observer and a hologram image having a point of view corresponding to the field of vision of the right eye of the observer are generated and provided to the left and right eyes of the observer, without generating hologram images for any other point of view. In this case, it is not necessary to generate hologram images having other points of view, and thus the amount of data processing is markedly reduced. In addition, current commercial display devices are capable of satisfying the resolution requirements of SLMs.

In order to implement the above-noted binocular hologram method, light containing images having points of view corresponding to both eyes of an observer must be directed to both eyes of the observer. It is therefore necessary to individually control two types of light.

SUMMARY

Example embodiments provide a beam deflector and a 3D display device including the beam deflector.

Additional aspects will be set forth in part in the description which follows and, in part, will be apparent from the description, or may be learned by practice of the presented embodiments.

According to an aspect of an example embodiment, there is provided a beam deflector including: a first deflector configured to controllably deflect incident light having a first polarization state in a first direction, the first direction being controlled in a first plane; a half-wave plate configured to rotate a polarization of light transmitted by the first deflector by 90°; and a second deflector configured to controllably deflect light transmitted by the half-wave plate having the first polarization state in a second direction that is different from the first direction, the second direction being controlled in the first plane.

Each of the first deflector and the second deflector may include a material having electrically controllable optical anisotropy.

Each of the first deflector and the second deflector may include: a first electrode portion; a second electrode portion; and a liquid crystal layer provided between the first electrode portion and the second electrode portion, the liquid crystal layer including liquid crystal molecules initially arranged in a mode in which a major-axis direction of the liquid crystal molecules is parallel with a direction of the first polarization state.

The first electrode portion may include a plurality of sub-electrodes, and wherein the plurality of sub-electrodes may be arranged horizontally at intervals and have a strip shape extending in a vertical direction.

The beam deflector may further include: a third deflector configured to controllably deflect incident light having a second polarization state in a third direction, the third direction being controlled in a second plane that is perpendicular to the first plane; a second half-wave plate configured to rotate a polarization of light transmitted by the third deflector by 90°; and a fourth deflector configured to controllably deflect light transmitted by the second half-wave plate having the second polarization state in a fourth direction that is different from the third direction, the fourth direction being controlled in the second plane.

Each of the third deflector and the fourth deflector may include: a third electrode portion; a fourth electrode portion; and a liquid crystal layer provided between the third electrode portion and the fourth electrode portion, the liquid crystal layer including liquid crystal molecules initially arranged in a mode in which a major-axis direction of the liquid crystal molecules is parallel with a direction of the second polarization state.

The third electrode portion may include a plurality of sub-electrodes, and the plurality of sub-electrodes may be arranged vertically at intervals and have a strip shape extending in a horizontal direction.

The beam deflector may further include: a third deflector provided at a same side of the half-wave plate as the first deflector, the third deflector being configured to controllably deflect incident light having a second polarization state in a third direction, the third direction being controlled in a second plane that is perpendicular to the first plane; and a fourth deflector provided at a same side of the half-wave plate as the second deflector, the fourth deflector being configured to controllably deflect incident light having the second polarization state in a fourth direction that is different from the third direction, the fourth direction being controlled in the second plane.

Each of the third deflector and the fourth deflector may include: a third electrode portion; a fourth electrode portion; and a liquid crystal layer provided between the third electrode portion and the fourth electrode portion, the liquid crystal layer including liquid crystal molecules initially arranged in a mode in which a major-axis direction of the liquid crystal molecules is parallel with a direction of the second polarization state.

The third electrode portion may include a plurality of sub-electrodes, and the plurality of sub-electrodes may be arranged vertically at intervals and have a strip shape extending in a horizontal direction.

According to an aspect of another example embodiment, there is provided a three-dimensional (3D) display device including: a light source configured to emit a coherent beam; a beam deflector configured to split and deflect the coherent beam emitted from the light source in two independent directions, wherein the beam deflector may include: a first deflector configured to controllably deflect incident light having a first polarization state in a first direction, the first direction being controlled in a first plane, a half-wave plate configured to rotate a polarization of light transmitted by the first deflector by 90°, and a second deflector configured to controllably deflect light transmitted by the half-wave plate having the first polarization state in a second direction that is different from the first direction, the second direction being controlled in the first plane; and a spatial light modulator configured to form a hologram image by diffracting light transmitted by the beam deflector.

Each of the first deflector and the second deflector may include a material having electrically controllable optical anisotropy.

Each of the first deflector and the second deflector may include: a first electrode portion; a second electrode portion; and a liquid crystal layer provided between the first electrode portion and the second electrode portion, the liquid crystal layer including liquid crystal molecules initially arranged in a mode in which a major-axis direction of the liquid crystal molecules is parallel with a direction of the first polarization state.

The first electrode portion may include a plurality of sub-electrodes, and the plurality of sub-electrodes may be arranged horizontally at intervals and have a strip shape extending in a vertical direction.

The beam deflector further may include: a third deflector configured to controllably deflect incident light having a second polarization state in a third direction, the third direction being controlled in a second plane that is perpendicular to the first plane; a second half-wave plate configured to rotate a polarization of light transmitted by the third deflector by 90°; and a fourth deflector configured to controllably deflect light transmitted by the second half-wave plate having the second polarization state in a fourth direction that is different from the third direction, the fourth direction being controlled in the second plane.

Each of the third deflector and the fourth deflector may include: a third electrode portion; a fourth electrode portion; and a liquid crystal layer provided between the third electrode portion and the fourth electrode portion, the liquid crystal layer including liquid crystal molecules initially arranged in a mode in which a major-axis direction of the liquid crystal molecules is parallel with a direction of the second polarization state.

The third electrode portion may include a plurality of sub-electrodes, and the plurality of sub-electrodes may be arranged vertically at intervals and have a strip shape extending in a horizontal direction.

The 3D display device may further include: a third deflector provided at a same side of the half-wave plate as the first deflector, the third deflector being configured to controllably deflect incident light having a second polarization state in a third direction, the third direction being controlled in a second plane that is perpendicular to the first plane; and a fourth deflector provided at a same side of the half-wave plate as the second deflector, the fourth deflector being configured to controllably deflect incident light having the second polarization state in a fourth direction that is different from the third direction, the fourth direction being controlled in the second plane.

Each of the third deflector and the fourth deflector may include: a third electrode portion; a fourth electrode portion; and a liquid crystal layer provided between the third electrode portion and the fourth electrode portion, the liquid crystal layer including liquid crystal molecules initially arranged in a mode in which a major-axis direction of the liquid crystal molecules is parallel with a direction of the second polarization state.

The third electrode portion may include a plurality of sub-electrodes, and the plurality of sub-electrodes may be arranged vertically at intervals and have a strip shape extending in a horizontal direction.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1:
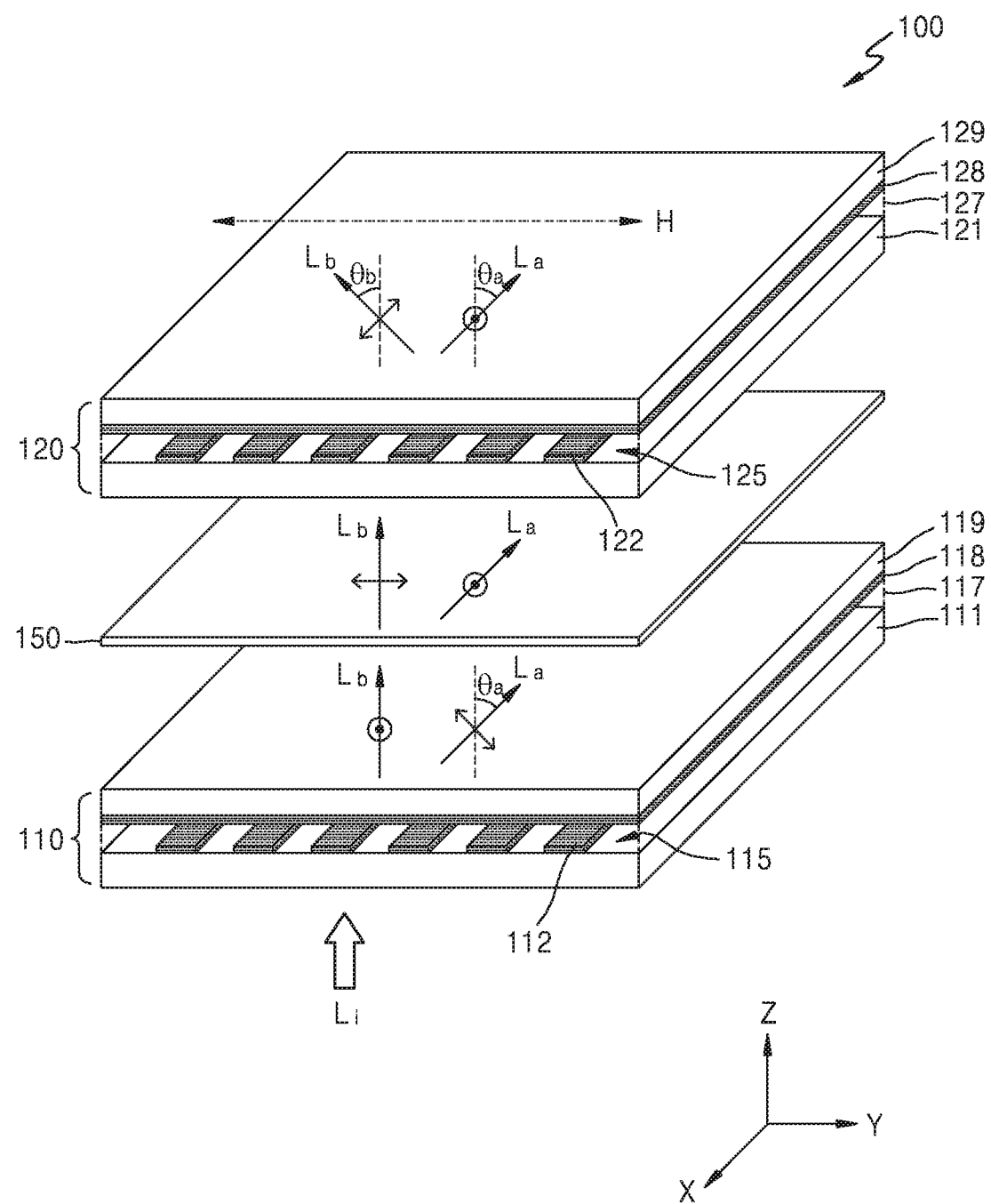
FIG. 1 is a perspective view schematically illustrating a beam deflector according to an example embodiment.

Reference will now be made in detail to example embodiments, which are illustrated in the accompanying drawings. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items.

Hereinafter, example embodiments will be described with reference to the accompanying drawings. In the drawings, like reference numerals refer to like elements, and the sizes of elements may be exaggerated for clarity of illustration. The example embodiments described herein are for illustrative purposes only, and various modifications may be made therein.

In the following description, when an element is referred to as being "above" or "on" another element, it may be directly on the other element while making contact with the other element or may be above the other element without making contact with the other element.

As used herein, the singular forms "a," "an" and "the" are intended to include the plural forms as well, unless the context clearly indicates otherwise. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form.

Operations of a method may be performed in appropriate order unless explicitly described in terms of order or described to the contrary. That is, operations are not limited to the order in which the operations are described. In the present disclosure, examples or exemplary terms (for example, "such as" and "etc.") are used for the purpose of description and are not intended to limit the scope of the inventive concept unless defined by the claims.

Figure 2:
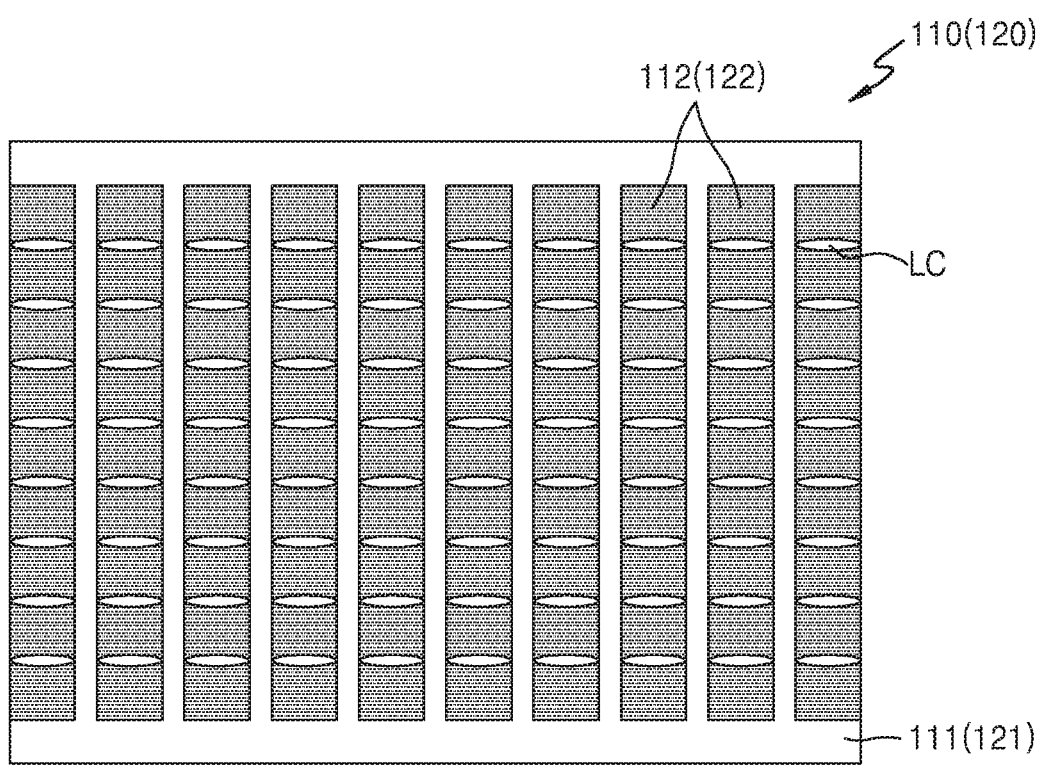
FIG. 2 is a plan view illustrating liquid crystal molecules and sub-electrodes of the beam deflector of FIG. 1.

FIG. 1 is a schematic perspective view illustrating a configuration of a beam deflector 100 according to an example embodiment, and FIG. 2 is a plan view illustrating liquid crystal molecules and shapes of sub-electrodes of the beam deflector 100 shown in FIG. 1.

The beam deflector 100 includes: a first deflector 110 configured to select light having a first polarization state from incident light $L_i$ and deflect the selected light in a first direction (i.e., in a first horizontal direction or first horizontal angle); a half-wave plate 150 placed in an optical path of light having passed through the first deflector 110 and configured to rotate the polarization direction of incident light by 90°; and a second deflector 120 configured to select light having the first polarization state from light incident thereon after passing through the half-wave plate 150 and deflect the selected light in a second direction (i.e., in a second horizontal direction or a second horizontal angle) different from the first direction.

The beam deflector 100 splits and deflects two different types of light in two directions, and independently controls the deflection directions. For example, in a display device, two different types of light may be modulated according to different pieces of image information. The two different types of light may have different polarization directions.

Incident light $L_i$ may be split and deflected by the beam deflector 100 according to the polarization state of the incident light $L_i$. Incident light $L_i$ may include light having a first polarization state and light having a second polarization state perpendicular to the first polarization state. In the following description and as shown, e.g., in FIG. 1, when the propagation direction of light is referred to as a Z-axis direction, the first polarization state is a linearly polarized state in a Y-axis direction and is denoted with the symbol "↔," and the second polarization state is a linearly polarized state in an X-axis direction and is denoted with the symbol "⊙."

The first deflector 110 is configured to select light having the first polarization state ↔ from incident light $L_i$ and deflect the selected light in the first direction while controlling the angle of deflection. To this end, the first deflector 110 may include a material having electrically controllable optical anisotropy. Optical anisotropy refers to a property showing different refractive indexes with respect to light having different polarization states. For example, the optically anisotropic material may have different refractive indexes for light having the first polarization state ↔ and light having the second polarization state ⊙. A liquid crystal material including liquid crystal molecules having different refractive indexes for light polarized in a major-axis direction of the liquid crystal molecules and light polarized in a direction perpendicular to the major-axis direction of the liquid crystal molecules will be described as an example of the optically anisotropic material. However, the optically anisotropic material is not limited thereto.

The first deflector 110 includes a liquid crystal layer 117, and first and second electrode portions 115 and 118 spaced apart from each other with the liquid crystal layer 117 provided therebetween. The first electrode portion 115 and the second electrode portion 118 may respectively be provided on transparent substrates 111 and 119 facing each other.

The second deflector 120 includes a liquid crystal layer 127, and first and second electrode portions 125 and 128 spaced apart from each other with the liquid crystal layer 127 provided therebetween. The first electrode portion 125 and the second electrode portion 128 may respectively be provided on transparent substrates 121 and 129 facing each other.

The first electrode portion 115 of the first deflector 110 may include a plurality of sub-electrodes 112, and the plurality of sub-electrodes 112 may be arranged at intervals in the Y-axis direction and may have a strip shape extending in the X-axis direction. Voltages applied to the plurality of sub-electrodes 112 may be individually controlled. The second electrode portion 118 of the first deflector 110 may have a flat-plate shape facing all the plurality of sub-electrodes 112, and a reference voltage may be applied to the second electrode portion 118 to apply a voltage between the second electrode portion 118 and each of the sub-electrodes 112 of the first electrode portion 115.

Similarly, the first electrode portion 125 of the second deflector 120 may include a plurality of sub-electrodes 122, and the plurality of sub-electrodes 122 may be arranged at intervals in the Y-axis direction and may have a strip shape extending in the X-axis direction. Voltages applied to the plurality of sub-electrodes 122 may be individually controlled. The second electrode portion 128 of the second deflector 120 may have a flat-plate shape facing all the plurality of sub-electrodes 122, and a reference voltage may be applied to the second electrode portion 128 to apply a voltage between the second electrode portion 128 and each of the sub-electrodes 122 of the first electrode portion 125.

The first electrode portions 115 and 125 and the second electrode portions 118 and 128 may include a transparent conductive material such as indium-tin-oxide (ITO), indium-zinc-oxide (IZO), or indium-tin-zinc-oxide (ITZO).

The transparent substrates 111, 119, 121, and 129 may include an insulative material such as glass or a transparent plastic material. Alignment layers may be further provided on the transparent substrates 111, 119, 121, and 129 to arrange liquid crystal molecules LC in a direction shown in FIG. 2.

Referring to FIG. 2, liquid crystal molecules LC of the liquid crystal layers 117 and 127 of the first deflector 110 and the second deflector 120 are initially arranged in a mode in which the major-axis direction of the liquid crystal molecules LC is parallel with a direction of the first polarization state ↔, that is, the Y-axis direction.

The arrangement of the sub-electrodes 112 and 122 and the initial arrangement of the liquid crystal molecules LC are in the directions shown in FIGS. 1 and 2 such that light having the first polarization state ↔ in the major-axis direction of the liquid crystal molecules LC, that is, in the Y-axis direction, may be deflected while controlling a trajectory of the deflection direction in a horizontal direction H. The horizontal direction H is equal to the Y-axis direction in FIGS. 1 and 2 and may be a transverse direction of a screen that a viewer sees when the beam deflector 100 is used in a display device.

With reference to FIGS. 3A to 3D and FIGS. 4A to 4D, the principle in which the first deflector 110 selects light having the first polarization state ↔ and deflects the light by a desired deflection angle without deflecting light having the second polarization state ⊙ will now be described. Although the first deflector 110 is described below as an example, the same principle is applied to the second deflector 120.

FIGS. 3A to 3D are example views respectively illustrating a voltage applied to the sub-electrodes 112 of the first deflector 110 of FIG. 1, refractive index distributions of the liquid crystal layer 117 with respect to light having the first polarization state and light having the second polarization state, and the deflection direction of incident light having the first polarization state.

Figure 3A:
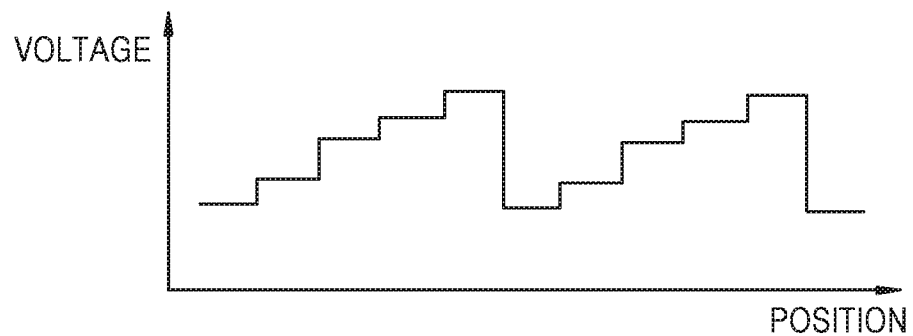
FIGS. 3A, 3B, 3C, and 3D are example views illustrating a voltage applied to sub-electrodes of a first deflector shown in FIG. 1, refractive index distributions of a liquid crystal layer with respect to light having a first polarization state and light having a second polarization state, and the deflection direction of incident light.

Referring to FIG. 3A, a voltage pattern applied to the plurality of sub-electrodes 112 may repeat in a stair form. This form of voltage induces an electric field distribution in the liquid crystal layer 117, and thus liquid crystal molecules LC are arranged according to the direction of the electric field. For example, if the liquid crystal molecules LC have positive dielectric anisotropy, major axes of the liquid crystal molecules LC may align with the direction of the electric field, and if the liquid crystal molecules LC have negative dielectric anisotropy, major axes of the liquid crystal molecules LC may align with a direction perpendicular to the direction of the electric field. The degree of rotation of the liquid crystal molecules LC is dependent on the intensity of the electric field at each position, and the alignment of the liquid crystal molecules LC may vary by position as shown in FIG. 3D. Since the liquid crystal molecules LC have different refractive indexes in the major-axis direction thereof and the minor-axis direction perpendicular to the major-axis direction, a refractive index gradient may be formed in the liquid crystal layer 117 according to the distribution of the alignment directions of the liquid crystal molecules LC.

Figure 3B:
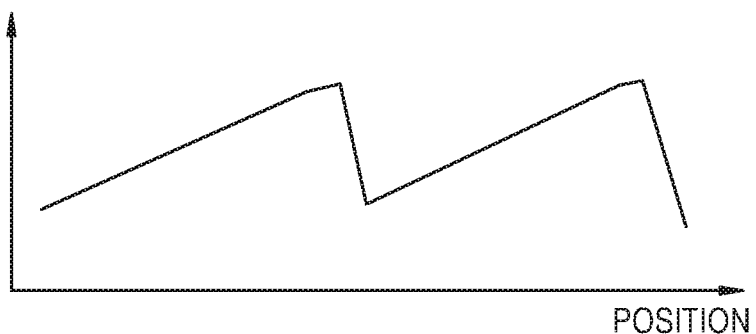
Figure 3C:
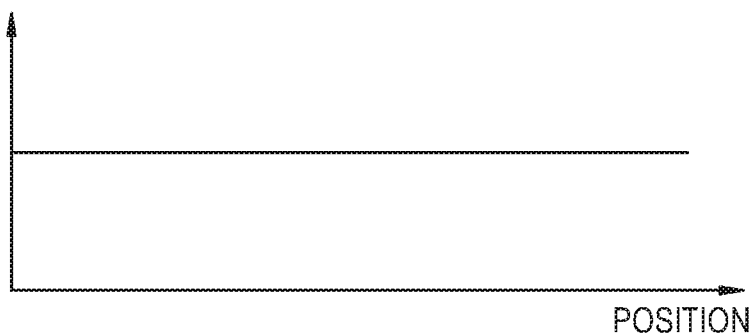
Figure 3D:
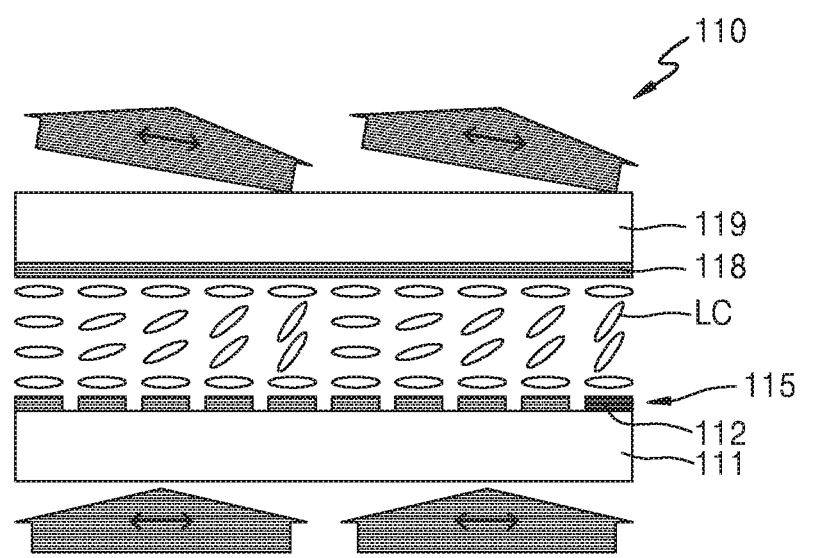
Figure 3D:
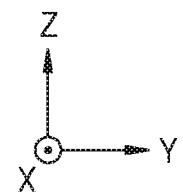

FIG. 3B illustrates an example refractive index distribution in the liquid crystal layer 117. The refractive index distribution appears with respect to light having the first polarization state ↔ in the alignment direction of the liquid crystal molecules LC, that is, in the major-axis direction of the liquid crystal molecules LC, but light having the second polarization state ⊙ in a direction perpendicular to the major-axis of the liquid crystal molecules LC does not experience a refractive index distribution in the liquid crystal layer 117. As shown in FIG. 3C, the refractive index of the liquid crystal layer 117 is constant with respect to position for light having the second polarization state ⊙. That is, light having the second polarization state ⊙ does not experience refractive index variations in the liquid crystal layer 117.

FIG. 3D illustrates deflection of light having the first polarization state ↔. Even after passing through the liquid crystal layer 117, light having the second polarization state ⊙ maintains a propagation direction thereof. That is, light having the second polarization state ⊙ is not deflected. The degree of deflection of light having the first polarization state ↔ may be controlled by adjusting a voltage between the first electrode portion 115 and the second electrode portion 118. In other words, a refractive index distribution for obtaining an intended deflection direction may be formed in the liquid crystal layer 117 by adjusting a voltage applied to each of the plurality of sub-electrodes 112 of the first electrode portion 115, thereby adjusting the direction of deflection of the light having the first polarization state ↔.

FIGS. 4A to 4D are other example views respectively illustrating a voltage applied to the sub-electrodes 112 of the first deflector 110 of FIG. 1, refractive index distributions of the liquid crystal layer 117 with respect to light having the first polarization state and light having the second polarization state, and the polarization direction of incident light.

Figure 4A:
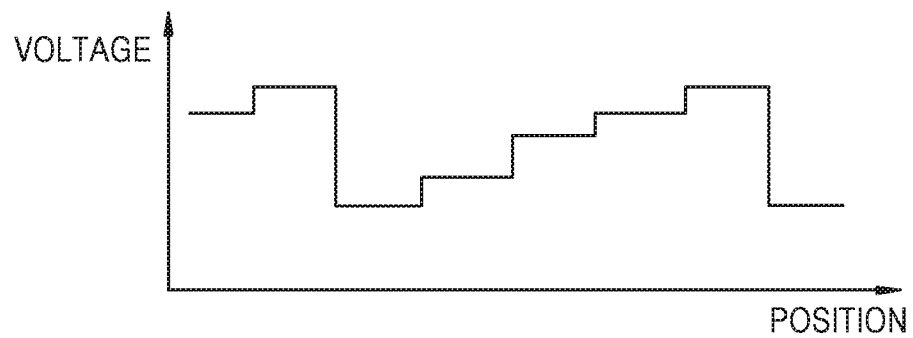
FIGS. 4A, 4B, 4C, and 4D are other example views illustrating a voltage applied to the sub-electrodes of the first deflector shown in FIG. 1, refractive index distributions of the liquid crystal layer with respect to light having the first polarization state and light having the second polarization state, and the deflection direction of incident light.
Figure 4B:
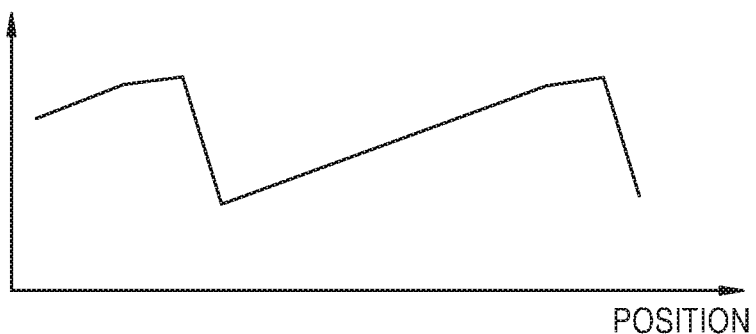
Figure 4C:
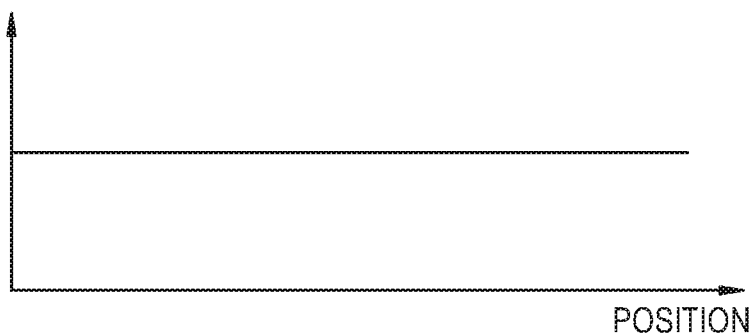
Figure 4D:
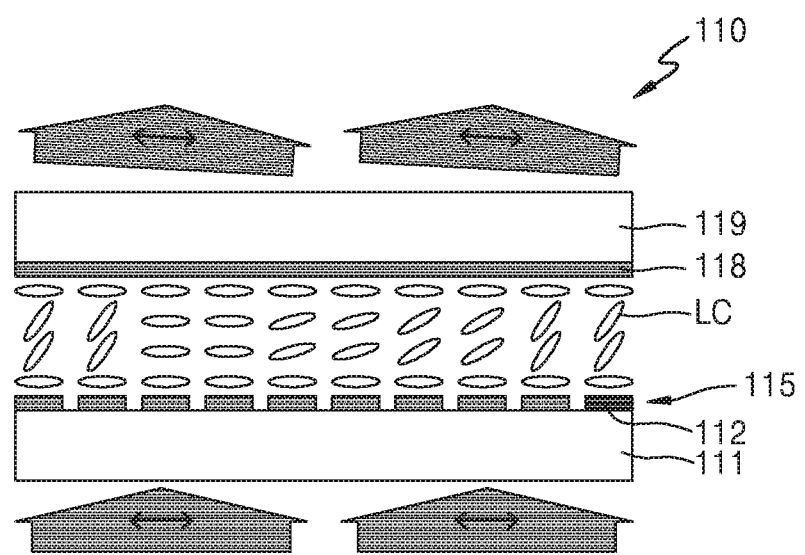

As shown in FIG. 4A, a voltage distribution different from that shown in FIG. 3A may be obtained by adjusting a voltage pattern applied to the sub-electrodes 112 as a function of their positions in the Y-axis direction. According to an electric field distribution induced by the voltage distribution, the liquid crystal molecules LC may be arranged in the liquid crystal layer 117 as shown in FIG. 4D. According to the arrangement of the liquid crystal molecules LC, the liquid crystal layer 117 may have a refractive index distribution with respect to light having the first polarization state as shown in FIG. 4B. The liquid crystal layer 117 has a constant refractive index with respect to light having the second polarization state ⊙, as shown in FIG. 4C. That is, light having the second polarization state ⊙ does not experience refractive index variations in the liquid crystal layer 117 and is not thus deflected.

Owing to the different refractive index distributions, light having the first polarization state ↔ incident on the liquid crystal layer 117 is deflected and output from the liquid crystal layer 117, as shown in FIG. 4D. The degree of deflection is different from that shown in FIG. 3D; that is, a deflection angle may be adjusted by varying a voltage pattern applied to the sub-electrodes 112. The trajectory along which the deflection angle is adjusted is in the direction in which the sub-electrodes 112 are arranged at intervals, that is, in the Y-axis direction. In other words, the deflection angle may be adjusted such that a Y-Z plane of light entering the first deflector 110 is maintained upon exiting the first deflector 110.

In the example embodiment, the beam deflector 100 includes the first deflector 110 and the second deflector 120 which are polarization selective deflectors, and if voltages applied to the first deflector 110 and the second deflector 120 are adjusted, two types of light may be separated and deflected at adjustable intended deflection angles using the beam deflector 100.

Referring back to FIG. 1, light $L_i$ incident on the beam deflector 100 is split and deflected in two directions as follows.

Light having polarization states perpendicular to each other may be randomly mixed in the incident light $L_i$, and as the incident light $L_i$ passes through the first deflector 110, the incident light $L_i$ may propagate in different directions according to the polarization states. As described above, the first deflector 110 deflects only light having the first polarization state ↔ in the alignment direction of the liquid crystal molecules LC of the liquid crystal layer 117. That is, light having the first polarization state ↔ is deflected by a deflection angle $\Theta_a$ from an incident direction and propagates in the first direction, and light having the second polarization state ⊙ propagates without any change in direction. The deflection angle $\Theta_a$ may be adjusted by varying a voltage pattern applied to the sub-electrodes 112, and since the sub-electrodes 112 are arranged at intervals in the Y-axis direction, the first direction may be adjusted within the Y-Z plane, that is, in the horizontal direction H as shown in FIG. 1. Hereinafter, two light beams propagating in separate optical paths will be referred to as a first split beam $L_a$ and a second split beam $L_b$.

The polarization of the first split beam $L_a$ and the second split beam $L_b$ separated by the first deflector 110 is changed when the first split beam $L_a$ and the second split beam $L_b$ pass through the half-wave plate 150. The polarization of the first split beam $L_a$ is changed from the first polarization state ↔ to the second polarization state ⊙, and the polarization of the second split beam $L_b$ is changed from the second polarization state ⊙ to the first polarization state ↔.

As the first split beam $L_a$ and the second split beam $L_b$ are incident on the second deflector 120, since the second deflector 120 is configured to deflect light having the first polarization state ↔, the second split beam $L_b$ having the first polarization state ↔ is deflected. The second split beam $L_b$ is deflected in the second direction different from the first direction. A deflection angle $\Theta_b$ may be adjusted by varying a voltage pattern applied to each of the sub-electrodes 122, and since the sub-electrodes 122 are arranged in the Y-axis direction, the second direction may be adjusted within the Y-Z plane, that is, in the horizontal direction H as shown in FIG. 1.

As described above, the beam deflector 100 may split incident light $L_i$ into a first split beam $L_a$ and a second split beam $L_b$ and may deflect the first split beam $L_a$ and the second split beam $L_b$ in different directions. The different directions may be adjusted in a horizontal direction. For example, the deflection directions of two types of light may be adjusted by considering the horizontal positions of the left and right eyes of an observer.

Figure 5:
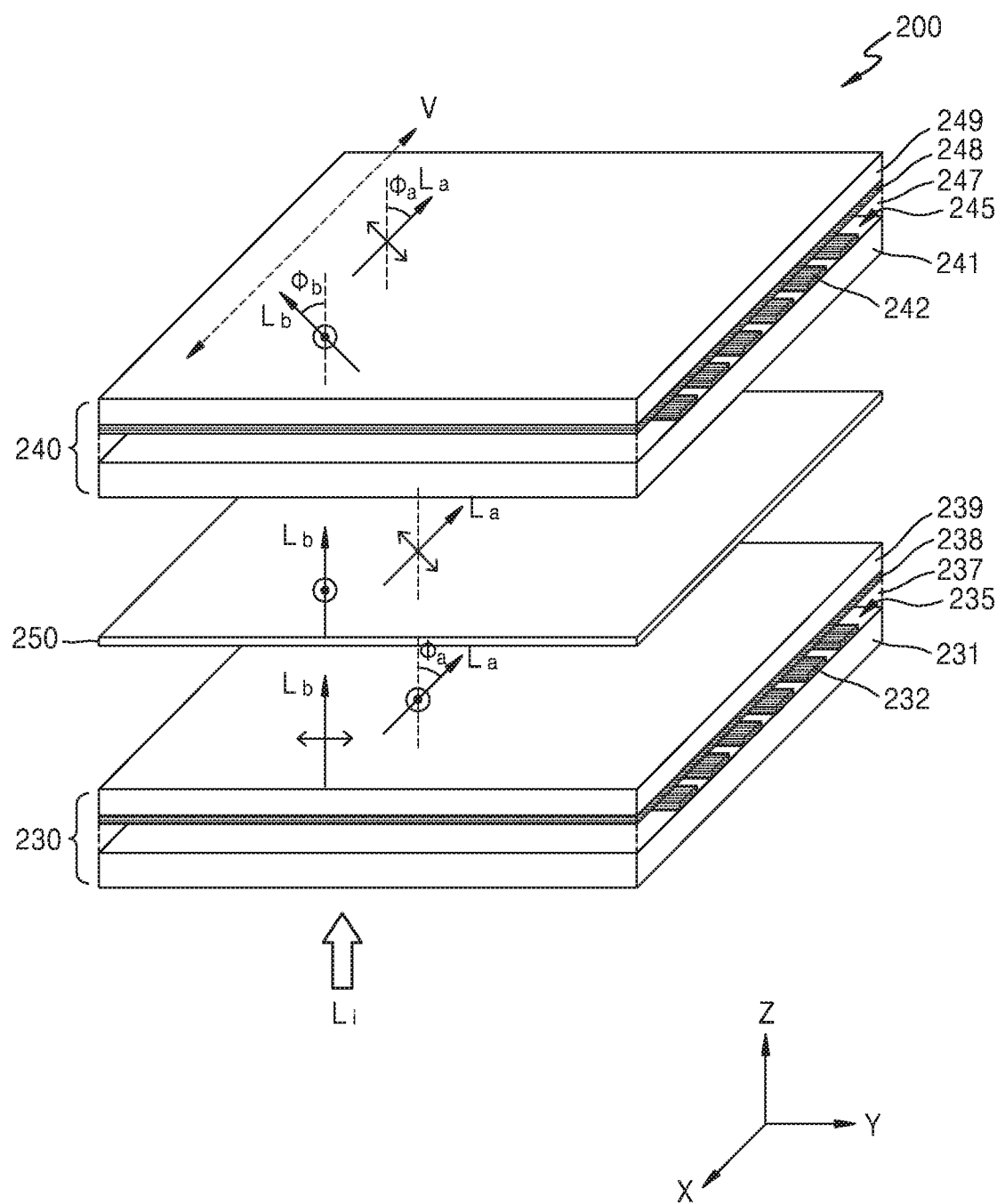
FIG. 5 is a perspective view schematically illustrating a beam deflector according to another example embodiment.
Figure 6:
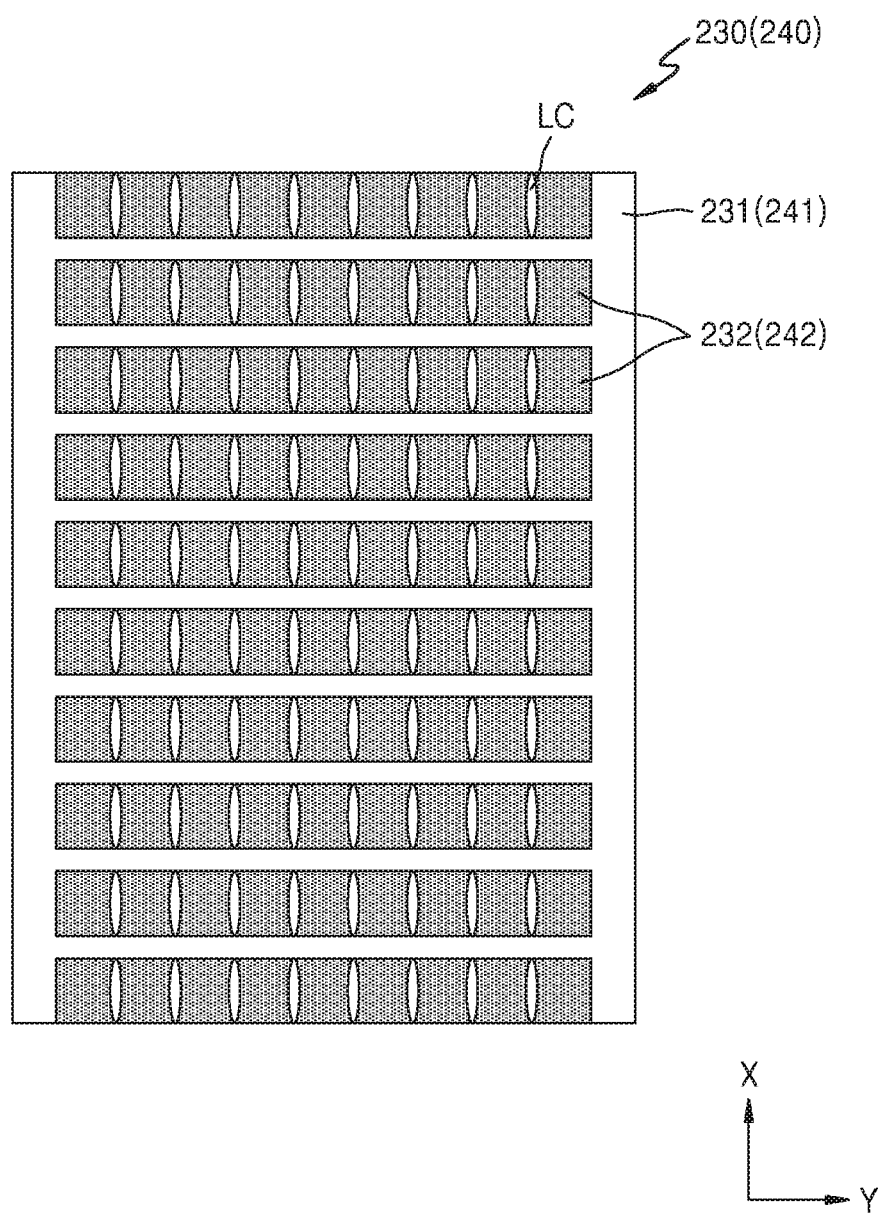
FIG. 6 is a plan view illustrating liquid crystal molecules and sub-electrodes of the beam deflector of FIG. 5.

FIG. 5 is a schematic perspective view illustrating a configuration of a beam deflector 200 according to another example embodiment, and FIG. 6 is a plan view illustrating liquid crystal molecules and shapes of sub-electrodes of the beam deflector 200 shown in FIG. 5.

The beam deflector 200 includes: a third deflector 230 configured to select light having a second polarization state ⊙ from incident light $L_i$ and deflect the selected light in a third direction (i.e., a third vertical direction or a third vertical angle); a half-wave plate 250 placed in an optical path of light having passed through the third deflector 230 and configured to rotate the polarization direction of incident light by 90°; and a fourth deflector 240 configured to select light having the second polarization state ⊙ from light incident thereon after passing through the half-wave plate 250 and deflect the selected light in a fourth direction (i.e., a fourth vertical direction or a fourth vertical angle) different from the third direction.

The beam deflector 200 of the present example embodiment is different from the beam deflector 100 shown in FIG. 1 in that two types of light beams $L_a$ and $L_b$ are deflected in two directions which are adjusted in the X-Z plane instead of the Y-Z plane. To this end, the arrangement direction of sub-electrodes 232 and 242 and the major-axis direction of liquid crystal molecules LC of the third deflector 230 and the fourth deflector 240 are different from those of the first deflector 110 and the second deflector 120.

The third deflector 230 includes a liquid crystal layer 237, and third and fourth electrode portions 235 and 238 spaced apart from each other with the liquid crystal layer 237 provided therebetween. The third electrode portion 235 and the fourth electrode portion 238 may respectively be provided on transparent substrates 231 and 239 facing each other.

The fourth deflector 240 includes a liquid crystal layer 247, and third and fourth electrode portions 245 and 248 spaced apart from each other with the liquid crystal layer 247 provided therebetween. The third electrode portion 245 and the fourth electrode portion 248 may respectively be provided on transparent substrates 241 and 249 facing each other.

The third electrode portion 235 of the third deflector 230 may include the plurality of sub-electrodes 232, and the plurality of sub-electrodes 232 may be arranged at intervals in the X-axis direction and may have a strip shape extending in the Y-axis direction. Voltages applied to the plurality of sub-electrodes 232 may be individually controlled. The fourth electrode portion 238 of the third deflector 230 may have a flat-plate shape facing all the plurality of sub-electrodes 232, and a reference voltage may be applied to the fourth electrode portion 238 to apply a voltage between the fourth electrode portion 238 and each of the sub-electrodes 232 of the third electrode portion 235.

Similarly, the third electrode portion 245 of the fourth deflector 240 may include the plurality of sub-electrodes 242, and the plurality of sub-electrodes 242 may be arranged at intervals in the X-axis direction and may have a strip shape extending in the Y-axis direction. Voltages applied to the plurality of sub-electrodes 242 may be individually controlled. The fourth electrode portion 248 of the fourth deflector 240 may have a flat-plate shape facing all the plurality of sub-electrodes 242, and a reference voltage may be applied to the fourth electrode portion 248 to apply a voltage between the fourth electrode portion 248 and each of the sub-electrodes 242 of the third electrode portion 245.

Referring to FIG. 6, liquid crystal molecules LC of the liquid crystal layers 237 and 247 of the third deflector 230 and the fourth deflector 240 are initially arranged in a mode in which the major-axis direction of the liquid crystal molecules LC is parallel with a direction of the second polarization state ⊙, that is, the X-axis direction. Alignment layers may be further provided on the transparent substrates 231, 241, 239, and 249 to arrange the liquid crystal molecules LC in a direction shown in FIG. 6.

As shown in FIGS. 5 and 6, the arrangement of the sub-electrodes 232 and 242 and the direction of alignment of the liquid crystal molecules LC in the initial arrangement mode are determined such that light having the second polarization state ⊙ in the major-axis direction of the liquid crystal molecules LC, that is, in the X-axis direction, may be deflected in a vertical direction V in the X-Z plane. The vertical direction V is equal to the X-axis direction in FIGS. 5 and 6 and may be a vertical direction of a screen that a viewer sees when the beam deflector 200 is used in a display device.

In the example embodiment, the beam deflector 200 includes the third deflector 230 and the fourth deflector 240 which are polarization selective deflectors, and if voltages applied to the third deflector 230 and the fourth deflector 240 are adjusted, two types of light may be separated and deflected at adjustable intended deflection angles using the beam deflector 200.

Referring back to FIG. 5, light $L_i$ incident on the beam deflector 200 is split and deflected in two directions as follows.

Light having polarization states perpendicular to each other may be randomly mixed in the incident light $L_i$, and as the incident light $L_i$ passes through the third deflector 230, the incident light $L_i$ may propagate in different directions according to the polarization states. As described above, the third deflector 230 deflects only light having the second polarization state ⊙ in the alignment direction of the liquid crystal molecules LC of the liquid crystal layer 237. That is, light having the second polarization state ⊙ is deflected by an angle $\phi_a$ from an incident direction and propagates in a third direction, and light having the first polarization state propagates through the third deflector without any change in direction. The deflection angle $\phi_a$ may be adjusted by varying a voltage pattern applied to the sub-electrodes 232, and since the sub-electrodes 232 are arranged at intervals in the X-axis direction, the third direction may be adjusted within the X-Z plane, that is, in the vertical direction V as shown in FIG. 5.

Since the third deflector 230 deflects only light having the second polarization state ⊙ by the angle $\phi_a$, the incident light $L_i$ is split into a first split beam $L_a$ and a second split beam $L_b$. The polarization of the first split beam $L_a$ and the second split beam $L_b$ is changed when the first split beam $L_a$ and the second split beam $L_b$ pass through the half-wave plate 250. The polarization of the first split beam $L_a$ is changed from the second polarization state ⊙ to the first polarization state and the polarization of the second split beam $L_b$ is changed from the first polarization state ↔ to the second polarization state ⊙.

As the first split beam $L_a$ and the second split beam $L_b$ are incident on the fourth deflector 240, since the fourth deflector 240 is configured to deflect light having the second polarization state ⊙, the second split beam $L_b$ having the second polarization state ⊙ is deflected. The second split beam $L_b$ is deflected in a fourth direction different from the third direction. A deflection angle $\phi_b$ may be adjusted by varying a voltage pattern applied to the sub-electrodes 242, and since the sub-electrodes 242 are arranged at intervals in the X-axis direction, the fourth direction may be adjusted in the X-Z plane, that is, in the vertical direction V as shown in FIG. 5.

As described above, the beam deflector 200 may split incident light $L_i$ into a first split beam $L_a$ and a second split beam $L_b$ and may deflect the first split beam $L_a$ and the second split beam $L_b$ in different directions. The trajectory in which the different directions are adjusted may be in a vertical direction. For example, the deflection directions of two types of light may be adjusted by considering the positions of the left and right eyes of an observer that may vary in a vertical direction as well as in a horizontal direction.

Figure 7:
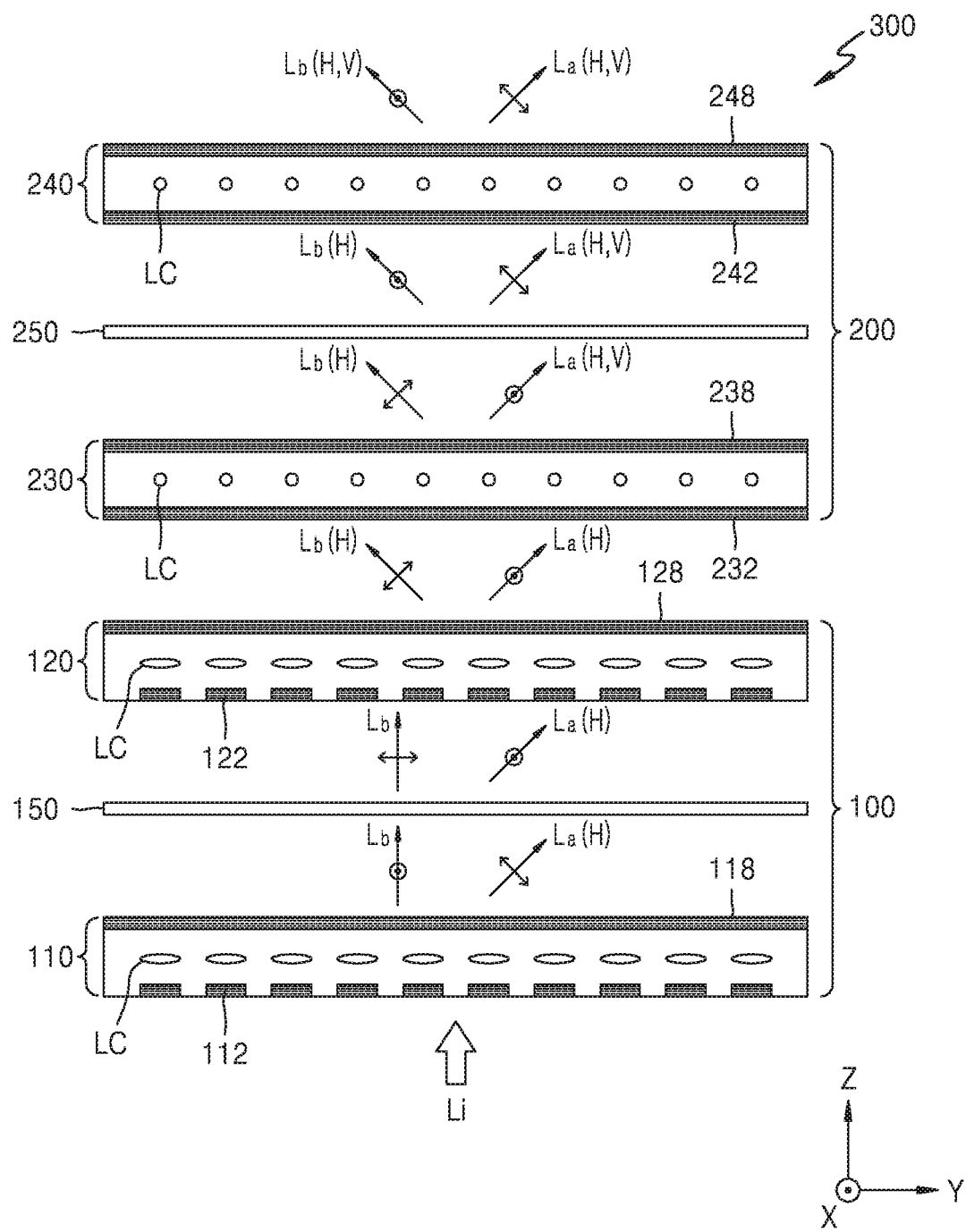
FIG. 7 is a cross-sectional view schematically illustrating a beam deflector according to another example embodiment.

FIG. 7 is a cross-sectional view schematically illustrating a beam deflector 300 according to another example embodiment.

The beam deflector 300 is configured to split and deflect incident light $L_i$ in two directions and is different from the beam deflectors 100 and 200 in that deflection variation paths are individually two-dimensionally adjustable in both the horizontal direction H and the vertical direction V.

The beam deflector 300 includes the beam deflector 100 shown in FIG. 1 and the beam deflector 200 shown in FIG. 5, and the beam deflector 100 and the beam deflector 200 may be arranged along an optical path. In FIG. 7, the beam deflector 100 and the beam deflector 200 are arranged such that light passing through the beam deflector 100 may be incident on the beam deflector 200. However, the beam deflector 100 and the beam deflector 200 are not limited to this arrangement. For example, the beam deflector 100 and the beam deflector 200 may be arranged in the reverse order.

In the structures of the beam deflectors 100 and 200, the transparent substrates of the first deflector 110, the second deflector 120, the third deflector 230, and the fourth deflector 240 are omitted for ease of illustration.

As described with reference to FIG. 1, the beam deflector 100 splits incident light $L_i$ into a first split beam $L_a$ and a second split beam $L_b$ and deflects the first split beam $L_a$ in a first direction and the second split beam $L_b$ in a second direction different from the first direction. The liquid crystal molecules LC of the first deflector 110 and the second deflector 120 are aligned in the horizontal direction H. The sub electrodes 112 and 122 are arranged in the horizontal direction H such that each one extends in the vertical direction V. The first and second split beams $L_a$ and $L_b$ are deflected by the first deflector 110 and the second deflector 120 in the horizontal direction H. Light that has undergone this deflection is denoted with (H).

The first split beam $L_a$ and the second split beam $L_b$ that are separated with certain deflection angles in the horizontal direction H are directed to the beam deflector 200, and as the first split beam $L_a$ and the second split beam $L_b$ pass through the beam deflector 200, the deflection angles of the first split beam $L_a$ and the second split beam $L_b$ are additionally adjusted in the vertical direction V. The liquid crystal molecules LC of the third deflector 230 and the fourth deflector 240 are aligned in the vertical direction V. The sub electrodes 232 and 242 are arranged in the vertical direction V such that each one extends in the horizontal direction H. Light that has undergone this additional deflection is denoted with (H, V).

FIGS. 8, 9, 10, and 11 are cross-sectional views schematically illustrating beam deflectors 400, 401, 402, and 403 according to other example embodiments.

The beam deflectors 400, 401, 402, and 403 shown in FIGS. 8, 9, 10, and 11 are modifications of the beam deflector 300 shown in FIG. 7. The beam deflectors 400, 401, 402, and 403 are the same as the beam deflector 300 in that incident light $L_i$ is split and deflected into two directions with a structure in which deflection adjustment paths are two-dimensionally individually adjustable in both the horizontal direction H and the vertical direction V and are different from the beam deflector 300 in that only one half-wave plate is used instead of two half-wave plates.

The beam deflector 400 includes a half-wave plate 150, a first deflector 110 and a fourth deflector 240 arranged on one side of the half-wave plate 150, and a third deflector 230 and a second deflector 120 arranged on the other side of the half-wave plate 150.

Figure 8:
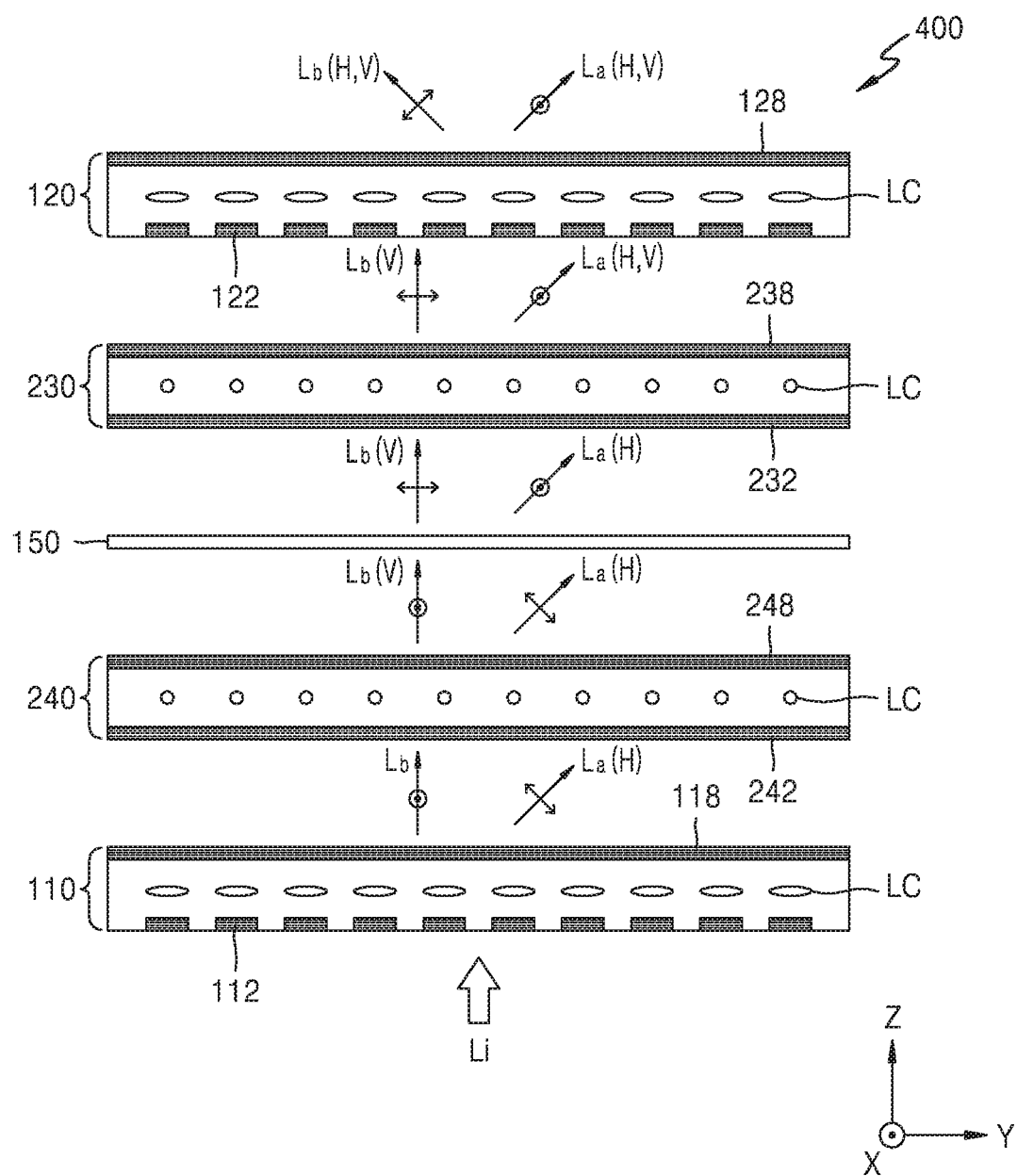
FIG. 8 is a cross-sectional view schematically illustrating a beam deflector according to another example embodiment.

In FIG. 8, the fourth deflector 240 is placed along an optical path after the first deflector 110. However, this arrangement may be reversed. Similarly, in FIG. 8, the second deflector 120 is placed along the optical path after the third deflector 230. However, this arrangement may be reversed. Example embodiments in which one or both of the arrangements is reversed as described above are illustrated in FIGS. 9 to 11.

With reference to FIG. 8, the manner in which incident light $L_i$ is split and deflected in two directions using the beam deflector 400 while two-dimensionally adjusting deflection angles will now be described.

Light $L_i$ incident on the beam deflector 400 is split into a first split beam $L_a$ and a second split beam $L_b$ while passing through the first deflector 110. The first split beam $L_a$ has a first polarization state ↔ and is deflected by an angle in the horizontal direction H by the first deflector 110. This deflection is denoted with (H). The second split beam $L_b$ has a second polarization state ⊙ and is not deflected while passing through the first deflector 110.

As the first split beam $L_a$ and the second split beam $L_b$ are incident on the fourth deflector 240, since the fourth deflector 240 is configured to deflect light having the second polarization state ⊙ in a vertical direction V, only the second split beam $L_b$ having the second polarization state ⊙ is deflected by an angle in the vertical direction V. This deflection is denoted with (V).

The polarization of the first split beam $L_a$ and the second split beam $L_b$ is changed by 90° when the first split beam $L_a$ and the second split beam $L_b$ pass through the half-wave plate 150. The polarization of the first split beam $L_a$ is changed from the first polarization state ↔ to the second polarization state ⊙, and the polarization of the second split beam $L_b$ is changed from the second polarization state ⊙ to the first polarization state ↔.

Next, as the first split beam $L_a$ and the second split beam $L_b$ are incident on the third deflector 230, since the third deflector 230 is configured to deflect light having the second polarization state ⊙ by an angle in the vertical direction V, the first split beam $L_a$ is additionally deflected by an angle in the vertical direction V. That is, the direction of the first split beam $L_a$ is determined as a result of deflection in the horizontal direction H and deflection in the vertical direction V, as denoted with (H, V).

Next, as the first split beam $L_a$ and the second split beam $L_b$ are incident on the second deflector 120, since the second deflector 120 is configured to deflect light having the first polarization state ↔ by an angle in a horizontal direction H, the second split beam $L_b$ is additionally deflected by an angle in the horizontal direction H. The direction of the second split beam $L_b$ is determined as a result of deflection in the horizontal direction H and deflection in the vertical direction V, as denoted with (H, V).

As described above, light incident on the beam deflector 400 is split into a first split beam $L_a$ and a second split beam $L_b$ and deflected in different directions, and the deflection directions may be individually adjusted by a horizontal angle and a vertical angle.

Figure 9:
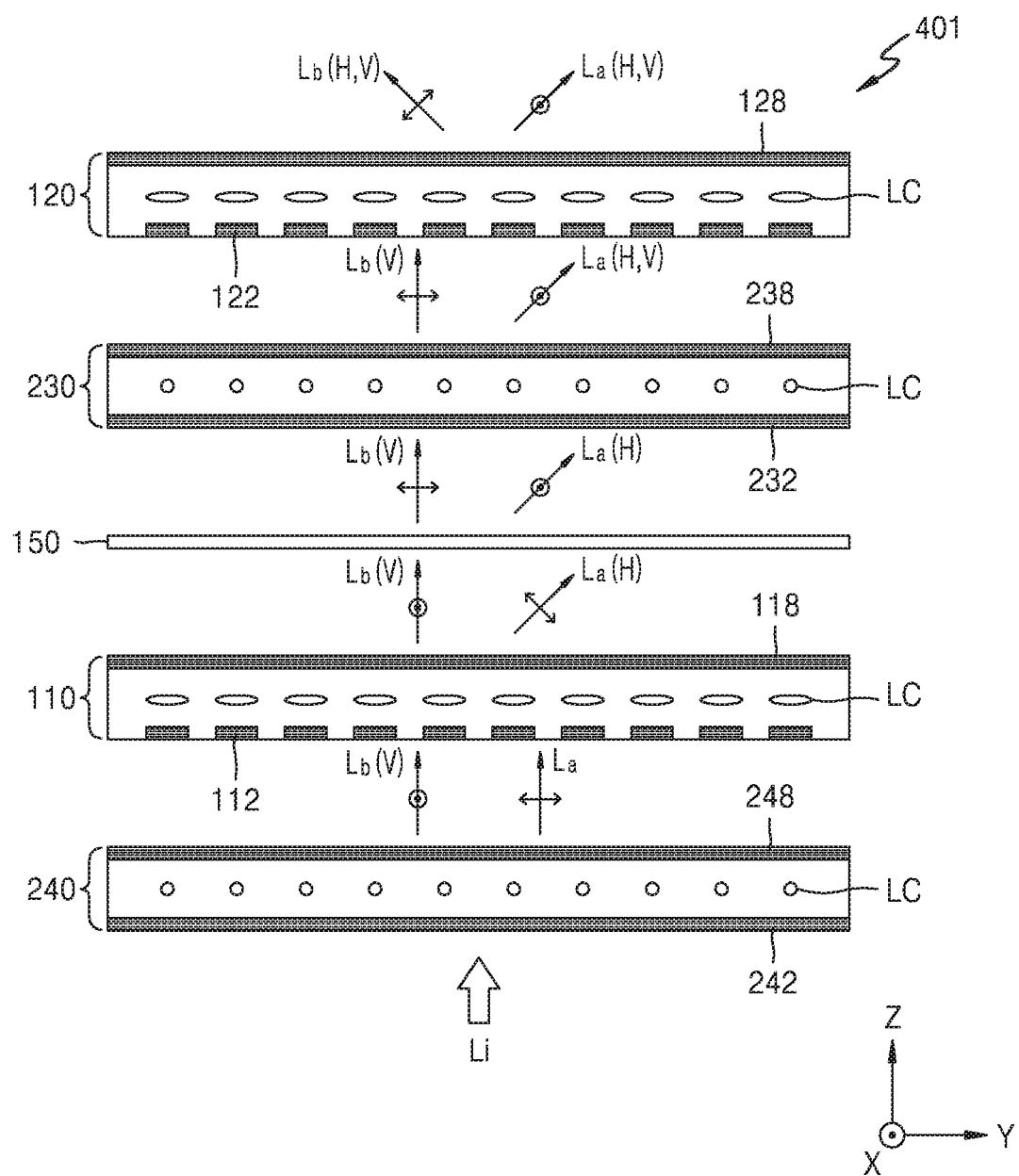
FIG. 9 is a cross-sectional view schematically illustrating a beam deflector according to another example embodiment.
Figure 10:
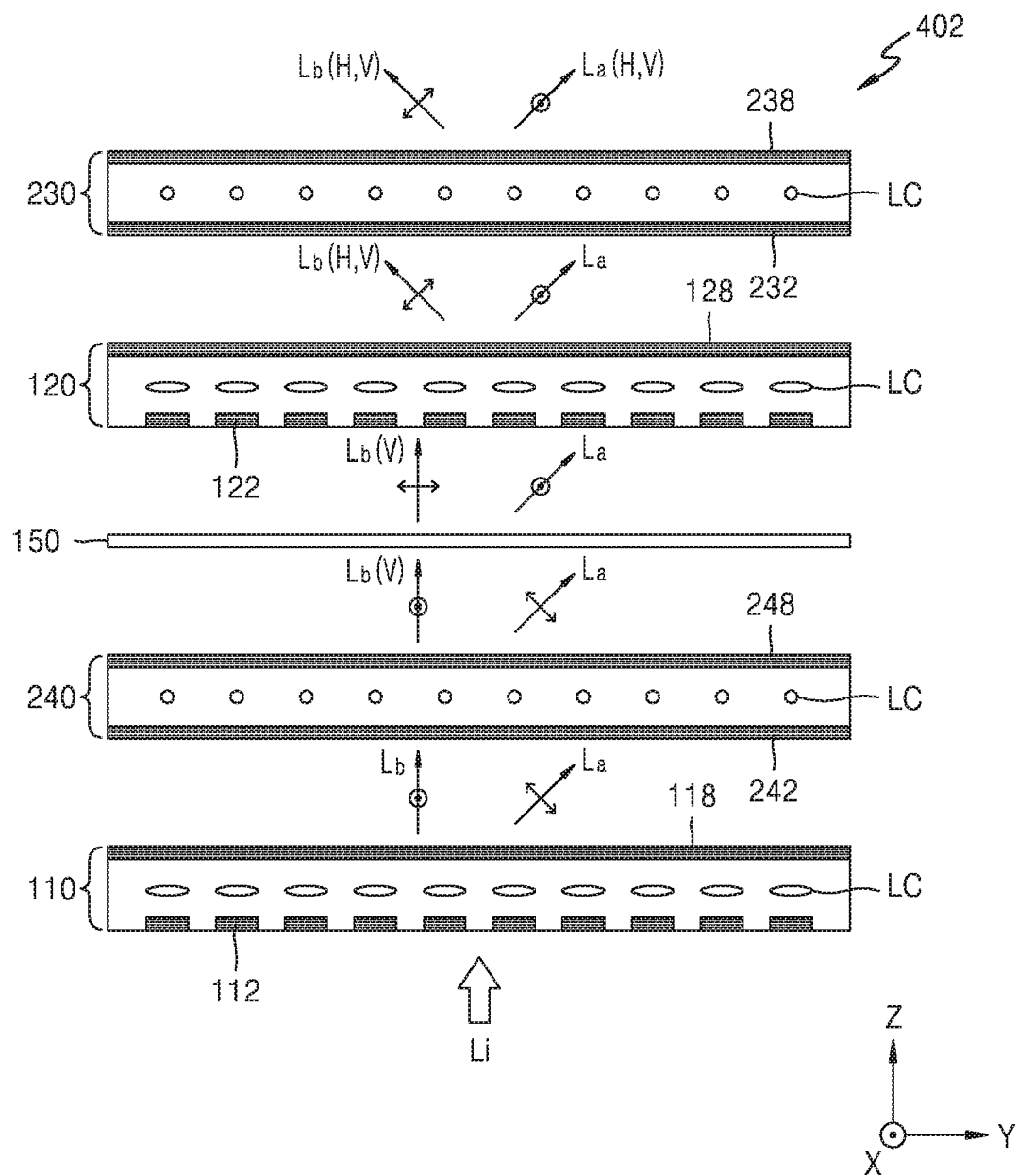
FIG. 10 is a cross-sectional view schematically illustrating a beam deflector according to another example embodiment.
Figure 11:
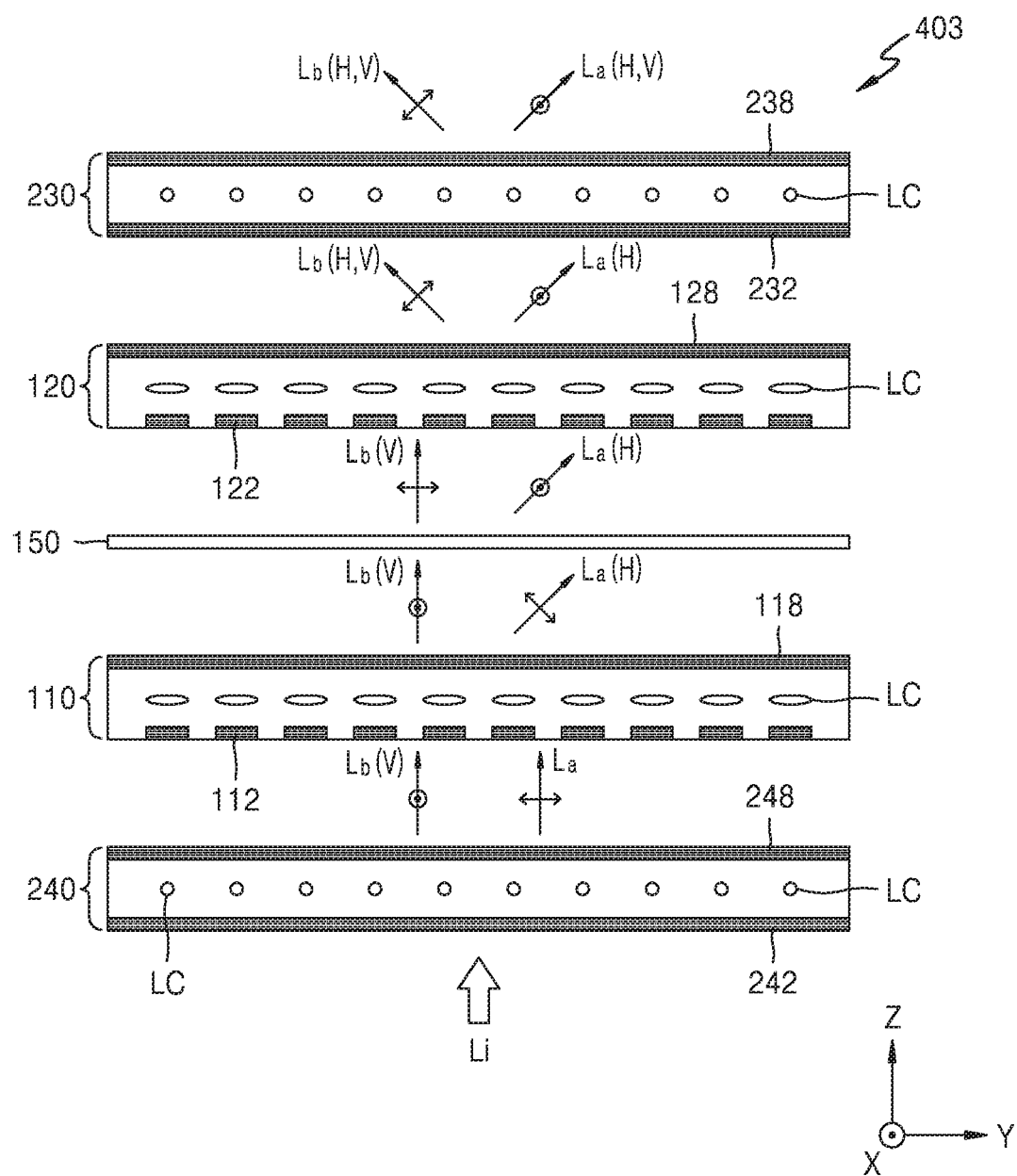
FIG. 11 is a cross-sectional view schematically illustrating a beam deflector according to another example embodiment.

The beam deflectors 401, 402, and 403 shown in FIGS. 9 to 11 are similarly configured to split incident light $L_i$ into a first split beam $L_a$ and a second split beam $L_b$ and deflects the first split beam $L_a$ and the second split beam $L_b$ in different directions. The beam deflectors 401, 402, and 403 are different from the beam deflector 400 shown in FIG. 8 in the order in which a first split beam $L_a$ and a second split beam $L_b$ are deflected in a horizontal direction and a vertical direction, but the same as the beam deflector 400 in that output light has undergone the same beam splitting and deflection in both directions.

Figure 12:
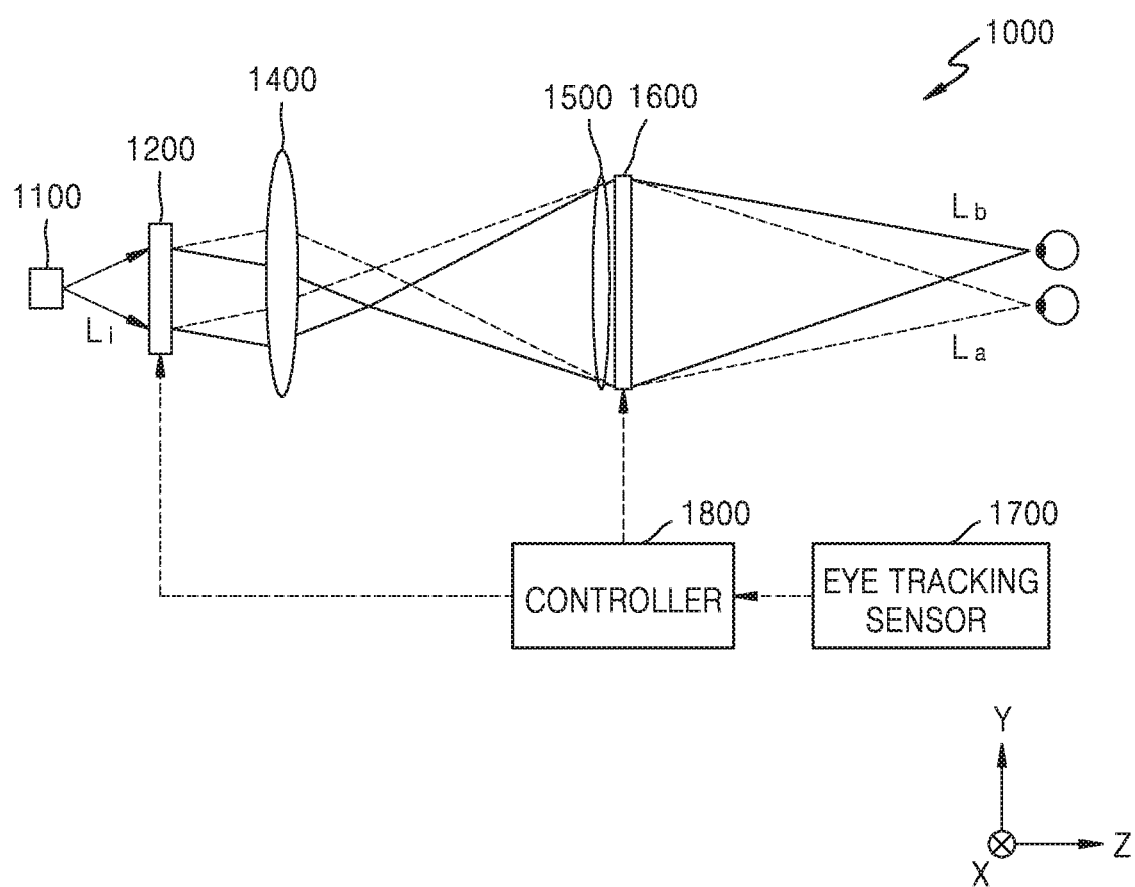
FIG. 12 is a cross-sectional view schematically illustrating a 3D display device according to an example embodiment.

FIG. 12 is a cross-sectional view schematically illustrating a 3D display device 1000 according to an example embodiment.

The 3D display device 1000 includes a light source 1100 providing a coherent light beam, a beam deflector 1200 configured to deflect light emitted from the light source 1100, and a spatial light modulator 1600 configured to diffract light to form a hologram image.

In addition, the 3D display device 1000 may further include an f-θ lens 1400 configured to enlarge a beam deflected by the beam deflector 1200 to a size corresponding to the spatial light modulator 1600 and adjust a focus of the light deflected by the beam deflector 1200 to be in a plane, and a field lens 1500 configured to focus a hologram image formed by the spatial light modulator 1600 in a given space. The arrangement order of the field lens 1500 and the spatial light modulator 1600 is not limited to that shown in FIG. 12. For example, the arrangement order may be reversed.

In addition, the 3D display device 1000 may further include an eye tracking sensor 1700 configured to track the positions of the left and right eyes of a viewer, and a controller 1800 configured to control the direction in which light is deflected by the beam deflector 1200 and perform a computer generating hologram (CGH) calculation for a hologram pattern formed by the spatial light modulator 1600.

The beam deflector 1200 may deflect light $L_i$ coming from the light source 1100 in two directions. A first split beam $L_a$ and a second split beam $L_b$ separated by the beam deflector 1200 may be directed to the left and right eyes of the viewer. The beam deflector 1200 may be the beam deflector 100 shown in FIG. 1 or any one of the beam deflectors 300, 400, 401, 402, and 403 shown in FIGS. 7 to 11. If the beam deflector 1200 is the beam deflector 100 shown in FIG. 1, the beam deflector 1200 deflects beams in the horizontal direction H (Y-axis direction) based on the shape of a screen viewed by the viewer. If the beam deflector 1200 is any one of the beam deflectors 300, 400, 401, 402, and 403, the beam deflector 1200 may deflect beams to two arbitrary positions while freely adjusting deflection of the beams in a horizontal direction H (Y-axis direction) and a vertical direction V (X-axis direction).

Light $L_i$ emitted from the light source 1100 is deflected by the beam deflector 1200 and is then incident on the spatial light modulator 1600 through the f-θ lens 1400 and the field lens 1500.

The two directional beams, that is, the first split beam $L_a$ and the second split beam $L_b$, are modulated in the spatial light modulator 1600. The spatial light modulator 1600 forms a hologram pattern having interference fringes for modulating light. Incident light may be diffracted and modulated by the hologram pattern formed by the spatial light modulator 1600, and thus hologram images may be reproduced at spatial positions. The first split beam $L_a$ may be used as left-eye hologram light, and the second split beam $L_b$ may be used as right-eye hologram light. That is, the spatial light modulator 1600 may reproduce a left-eye hologram image using the first split beam $L_a$, and a right-eye hologram image using the second split beam $L_b$.

The controller 1800 may control the beam deflector 1200 based on information about the positions of the left and right eyes of the viewer sensed by the eye tracking sensor 1700. In addition, the controller 1800 may control the spatial light modulator 1600 such that a left-eye hologram image may be reproduced using the first split beam $L_a$, and a right-eye hologram image may be reproduced using the second split beam $L_b$.

Since the beam deflector 1200 is capable of splitting and deflecting a beam according to information about the horizontal (Y-axis direction) and vertical (X-axis direction) positions of the left and right eyes of the viewer, the viewer may watch 3D images without positional limitations. In addition, since hologram images are formed only within the field of vision of the viewer, the amount of CGH calculations may be markedly reduced.

Figure 13:
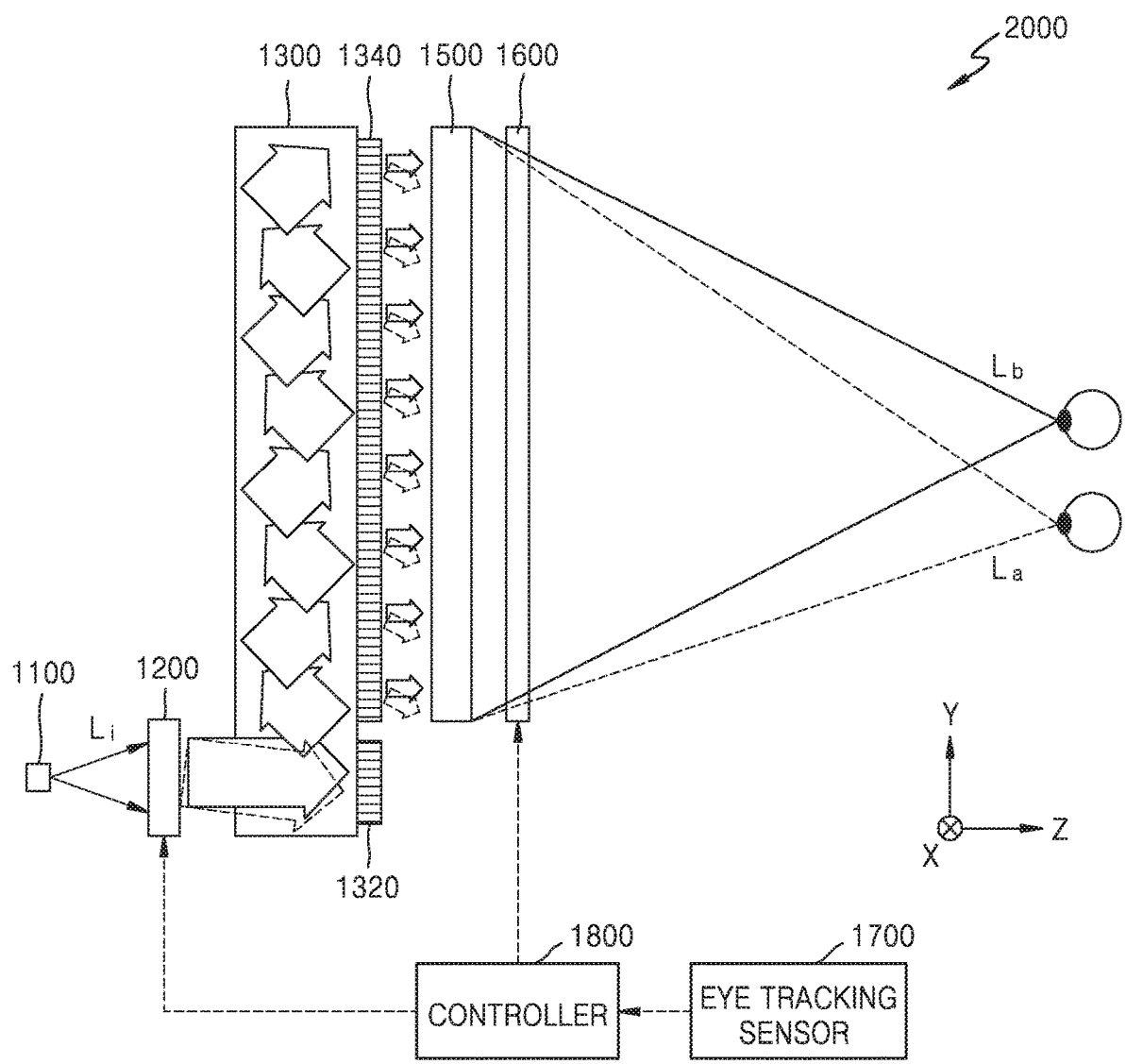
FIG. 13 is a perspective view schematically illustrating a 3D display device according to another example embodiment.

FIG. 13 is a perspective view schematically illustrating a 3D display device 2000 according to another example embodiment.

The 3D display device 2000 includes a light source 1100 providing a coherent light beam, a beam deflector 1200 configured to deflect light emitted from the light source 1100, and a spatial light modulator 1600 configured to diffract incident light to form a hologram image. In addition, the 3D display device 2000 may further include: a light guide unit 1300 configured to guide light emitted from the light source 1100 such that the light may propagate toward the spatial light modulator 1600; and a field lens 1500 configured to focus a hologram image in a given space. The arrangement order of the field lens 1500 and the spatial light modulator 1600 is not limited to that shown in FIG. 13. For example, the arrangement order may be reversed.

In addition, the 3D display device 2000 may further include an eye tracking sensor 1700 configured to track the positions of the left and right eyes of a viewer, and a controller 1800 configured to control the direction in which light is deflected by the beam deflector 1200 and perform a CGH calculation for a hologram pattern formed by the spatial light modulator 1600.

The beam deflector 1200 may deflect light $L_i$ coming from the light source 1100 in two directions. A first split beam $L_a$ and a second split beam $L_b$ separated by the beam deflector 1200 may be directed to the left and right eyes of the viewer. The beam deflector 1200 may be the beam deflector 100 shown in FIG. 1 or any one of the beam deflectors 300, 400, 401, 402, and 403 shown in FIGS. 7 to 11. If the beam deflector 1200 is the beam deflector 100 shown in FIG. 1, the beam deflector 1200 deflects beams in the horizontal direction H (Y-axis direction) based on the shape of a screen viewed by the viewer. If the beam deflector 1200 is any one of the beam deflectors 300, 400, 401, 402, and 403, the beam deflector 1200 may deflect beams to two arbitrary positions while freely adjusting deflection of the beams in the horizontal direction H (Y-axis direction) and the vertical direction V (X-axis direction).

The 3D display device 2000 of the example embodiment is configured such that the 3D display device 2000 may have a thickness smaller than that of the 3D display device 1000 shown in FIG. 12. The Z-axis length of the 3D display device 1000 shown in FIG. 12 increases as the size difference between the beam deflector 1200 and the spatial light modulator 1600 increases. The 3D display device 2000 of the present example embodiment includes the light guide unit 1300 to enlarge beams deflected by the beam deflector 1200 according to the size of the spatial light modulator 1600, and thus the 3D display device 2000 may have a relatively smaller Z-axis length.

After light $L_i$ emitted from the light source 1100 is deflected by the beam deflector 1200, the light $L_i$ is guided and enlarged to a size corresponding to the spatial light modulator 1600 by the light guide unit 1300 and is then output toward the spatial light modulator 1600. The light guide unit 1300 may include: an input coupler 1320 on which light deflected by the beam deflector 1200 is incident; and an output coupler 1340 through which the light is output after being guided along the light guide unit 1300.

Two directional beams output through the light guide unit 1300 are incident on the spatial light modulator 1600 through the field lens 1500. The spatial light modulator 1600 forms a hologram pattern having interference fringes for modulating incident light. Incident light may be diffracted and modulated by the hologram pattern formed by the spatial light modulator 1600, and thus a hologram image may be reproduced at a given spatial position. A left-eye hologram image may be reproduced at a left-eye position, and a right-eye hologram image may be reproduced at a right-eye position.

The first split beam $L_a$ may be used as left-eye hologram light, and the second split beam $L_b$ may be used as right-eye hologram light. That is, the spatial light modulator 1600 may reproduce a left-eye hologram image using the first split beam $L_a$, and a right-eye hologram image using the second split beam $L_b$.

The controller 1800 may control the beam deflector 1200 by reflecting information about the positions of the left and right eyes of the viewer sensed by the eye tracking sensor 1700. In addition, the controller 1800 may control the spatial light modulator 1600 such that a left-eye hologram image may be reproduced using the first split beam $L_a$, and a right-eye hologram image may be reproduced using the second split beam $L_b$.

Since the beam deflector 1200 is capable of splitting and deflecting a beam based on information about the horizontal (Y-axis direction) and vertical (X-axis direction) positions of the left and right eyes of the viewer, the viewer may watch 3D images without positional limitations. In addition, since hologram images are formed only within the field of vision of the viewer, the amount of CGH calculations may be markedly reduced.

The position of the beam deflector 1200 in the 3D display device 1000 or 2000 shown in FIG. 12 or 13 is an example position. That is, the position of the beam deflectors 1200 is not limited thereto. For example, the beam deflector 1200 may be at another position. For example, the beam deflector 1200 may be placed between the field lens 1500 and the spatial light modulator 1600, or the spatial light modulator 1600 may be placed between the field lens 1500 and the beam deflector 1200.

As described above, according to the above example embodiments, the beam deflectors include a liquid crystal material. However, the beam deflectors may include any other optical anisotropic material having controllable anisotropy and an element for controlling the anisotropy of the material.

The beam deflectors are configured to independently deflect two types of light in two directions.

The two directions in which the beam deflectors deflect light may be two-dimensionally controlled.

The beam deflectors may be employed in 3D display devices to provide high-quality 3D images while performing fewer calculations.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:
1. A beam deflector comprising:
a first deflector that receives light incident upon the beam deflector and controllably deflects a first portion of the light in a first direction, the first portion of the light having a first polarization direction, the first direction being controlled in a first plane;

a half-wave plate that rotates a polarization of the light transmitted by the first deflector by 90°;

a second deflector that controllably deflects a second portion of the light transmitted by the half-wave plate in a second direction that is different from the first direction, the second portion of the light having the first polarization direction after rotation by the half-wave plate, the second direction being controlled in the first plane;

a third deflector provided at a same side of the half-wave plate as the first deflector, the third deflector controllably deflecting the second portion of the light in a third direction, the second portion of the light having a second polarization direction different from the first polarization direction before rotation by the half-wave plate, the third direction being controlled in a second plane that is perpendicular to the first plane; and a fourth deflector provided at a same side of the half-wave plate as the second deflector, the fourth deflector controllably deflecting the first portion of the light in a fourth direction that is different from the third direction, the first portion of the light having the second polarization direction after rotation by the half-wave plate, the fourth direction being controlled in the second plane, wherein the beam deflector deflects the first portion of the light in the first direction and the second portion of the light in the second direction which is not parallel to the first direction.

2. The beam deflector of claim 1, wherein each of the first deflector and the second deflector comprises a material having electrically controllable optical anisotropy.

3. The beam deflector of claim 1, wherein each of the first deflector and the second deflector comprises:
a first electrode portion;
a second electrode portion; and
a liquid crystal layer provided between the first electrode portion and the second electrode portion, the liquid crystal layer comprising liquid crystal molecules initially arranged in a mode in which a major-axis direction of the liquid crystal molecules is parallel with the first polarization direction.

4. The beam deflector of claim 3, wherein the first electrode portion comprises a plurality of sub-electrodes, and
wherein the plurality of sub-electrodes are arranged horizontally at intervals and have a strip shape extending in a vertical direction.

5. The beam deflector of claim 1, wherein each of the third deflector and the fourth deflector comprises:
a third electrode portion;
a fourth electrode portion; and
a liquid crystal layer provided between the third electrode portion and the fourth electrode portion, the liquid crystal layer comprising liquid crystal molecules initially arranged in a mode in which a major-axis direction of the liquid crystal molecules is parallel with the second polarization direction.

6. The beam deflector of claim 5, wherein the third electrode portion comprises a plurality of sub-electrodes, and
wherein the plurality of sub-electrodes are arranged vertically at intervals and have a strip shape extending in a horizontal direction.

7. The beam deflector of claim 1, wherein the second portion of the light has the second polarization direction orthogonal to the first polarization direction before rotation by the half-wave plate.

8. A three-dimensional (3D) display device comprising:
a light source that emits a coherent beam;
a beam deflector that splits and deflects the coherent beam emitted from the light source in two different directions which are not parallel to each other, wherein the beam deflector comprises:
a first deflector that receives light incident upon the beam deflector and controllably deflects a first portion of the light in a first direction, the first portion of the light having a first polarization direction, the first direction being controlled in a first plane;
a half-wave plate that rotates a polarization of the light transmitted by the first deflector by 90°;
a second deflector that controllably deflects a second portion of the light transmitted by the half-wave plate in a second direction that is different from the first direction, the second portion of the light having the first polarization direction after rotation by the half-wave plate, the second direction being controlled in the first plane;
a third deflector provided at a same side of the half-wave plate as the first deflector, the third deflector controllably deflecting the second portion of the light in a third direction, the second portion of the light having a second polarization direction different from the first polarization direction before rotation by the half-wave plate, the third direction being controlled in a second plane that is perpendicular to the first plane; and
a fourth deflector provided at a same side of the half-wave plate as the second deflector, the fourth deflector controllably deflecting the first portion of the light in a fourth direction that is different from the third direction, the first portion of the light having the second polarization direction after rotation by the half-wave plate, the fourth direction being controlled in the second plane; and
a spatial light modulator that forms a hologram image by diffracting light transmitted by the beam deflector,
wherein the beam deflector deflects the first portion of the light in the first direction and the second portion of the light in the second direction which is not parallel to the first direction.

9. The 3D display device of claim 8, wherein each of the first deflector and the second deflector comprises a material having electrically controllable optical anisotropy.

10. The 3D display device of claim 8, wherein each of the first deflector and the second deflector comprises:
a first electrode portion;
a second electrode portion; and
a liquid crystal layer provided between the first electrode portion and the second electrode portion, the liquid crystal layer comprising liquid crystal molecules initially arranged in a mode in which a major-axis direction of the liquid crystal molecules is parallel with the first polarization direction.

11. The 3D display device of claim 10, wherein the first electrode portion comprises a plurality of sub-electrodes, and
wherein the plurality of sub-electrodes are arranged horizontally at intervals and have a strip shape extending in a vertical direction.

12. The 3D display device of claim 8, wherein each of the third deflector and the fourth deflector comprises:
- a third electrode portion;
- a fourth electrode portion; and
- a liquid crystal layer provided between the third electrode portion and the fourth electrode portion, the liquid crystal layer comprising liquid crystal molecules initially arranged in a mode in which a major-axis direction of the liquid crystal molecules is parallel with the second polarization direction.

13. The 3D display device of claim 12, wherein the third electrode portion comprises a plurality of sub-electrodes, and
- wherein the plurality of sub-electrodes are arranged vertically at intervals and have a strip shape extending in a horizontal direction.

14. A beam deflector comprising:
- a first deflector that receives light incident upon the beam deflector and deflects a first portion of the light having a first polarization direction at a first horizontal angle without deflecting a second portion of the light having a second polarization direction different from the first polarization direction, the first portion of the light and the second portion of the light being incident from a same light source;
- a half-wave plate provided between the first deflector and a second deflector, the half-wave plate rotating a polarization direction of light exiting the first deflector by 90° such that the first portion of the light has the second polarization direction and the second portion of the light has the first polarization direction;
- the second deflector that deflects the second portion of the light having the first polarization direction at a second horizontal angle different from the first horizontal angle without deflecting the first portion of the light having the second polarization direction;
- a third deflector provided at a same side of the half-wave plate as the first deflector, the third deflector deflecting the second portion of the light at a first vertical angle; and
- a fourth deflector provided at a same side of the half-wave plate as the second deflector, the fourth deflector deflecting the first portion of the light at a second vertical angle different from the first vertical angle,
- wherein the beam deflector deflects the first portion of the light at the first horizontal angle and the second portion of the light at the second horizontal angle which is not parallel to the first horizontal angle.

15. The beam deflector of claim 14, wherein each of the first deflector and the second deflector comprises a liquid crystal layer including liquid crystal molecules orientable by application of a voltage pattern to the liquid crystal layer, and
- wherein the beam deflector further comprises a controller that adjusts the voltage pattern applied to the liquid crystal layer.

16. The beam deflector of claim 15, wherein each of the first deflector and the second deflector further comprises a plurality of electrode strips extending in a vertical direction and arranged at intervals in a horizontal direction, and
- wherein the controller applies a horizontally repeating pattern to the plurality of electrode strips as the voltage pattern.

17. The beam deflector of claim 14, wherein the first polarization direction is orthogonal to the second polarization direction.

* * * * *